UNITED STATES PATENT OFFICE.

MATTHEW T. HAGEN, OF BROOKLYN, NEW YORK, ASSIGNOR OF THREE-EIGHTHS HIS RIGHT TO ANDREW J. CRAWFORD, OF SAME PLACE.

IMPROVEMENT IN THE MANUFACTURE OF ARTIFICIAL STONE.

Specification forming part of Letters Patent No. 133,774, dated December 10, 1872.

*To all whom it may concern:*

Be it known that I, MATTHEW T. HAGEN, of Brooklyn, in the county of Kings and State of New York, have invented certain new and useful Improvements in the Manufacture of Artificial Stone, of which the following is a specification:

This invention has for its object the production of a composition of matter which shall "set," giving a hard, firm, and durable stone, which shall possess a great degree of strength, in reference to tensile strain, shall be lighter or heavier for a given bulk accordingly as the several ingredients are used in varying proportions, and shall be admirably adapted for molding ornamental designs, blocks for building purposes, tiles for paving, and for such other purposes as compositions of this class are employed.

The substances used in forming this composition are hydraulic cement, massicot, asbestus, pulverized flint-rock or quartz, and sand. The hydraulic cements employed are Portland, Louisville, Rosendale, Pozzuolana, and other well-known cements of similar character and properties, which act as the cementing or binding mediums. Portland is the cement I prefer to use, and its average weight should be one hundred and eighteen or one hundred and twenty pounds to the bushel. As an additional cementing medium I employ the yellow protoxide of lead, known as massicot. The third article, asbestus, I use in two forms, and for two distinct purposes: first, if I require a block to bear a tensile strain, I use the asbestus in a fibrous or filamentous condition, in which state it performs a function akin to the hair used in common mortar; but if I desire a stone which shall be of light weight in proportion to its size or bulk, I reduce the asbestus to as fine a powder as is practicable. The fourth article, viz., flint-rock, may be prepared by being calcined, thrown into cold water, and finally powdered, or by being pulverized in any other manner.

Having noted the above, the several ingredients, and the functions they perform in the compound, I will now recite the formula for several different qualities of the compound or artificial stone, premising that quantities of the ingredients may be somewhat varied, and the mode of mixing changed without departing from the spirit of my invention.

For a stucco or for molded articles, take of—

| | |
|---|---|
| Portland cement | 10 volumes. |
| Massicot | 2 " |
| Pulverized flint or quartz | 40 " |
| Pulverized asbestus | 8 " |
| Clean sand | 40 " |
| | 100 " |

For building-blocks and similar articles, take of—

| | |
|---|---|
| Portland cement | 15 volumes. |
| Massicot | 5 " |
| Fibrous asbestus | 10 " |
| Pulverized flint or quartz | 50 " |
| Sand | 20 " |
| | 100 " |

For sidewalks, pavements, &c., take of—

| | |
|---|---|
| Hydraulic cement | 8 volumes. |
| Massicot | 4 " |
| Fibrous asbestus | 8 " |
| Pulverized flint or quartz | 40 " |
| Fine sand | 40 " |
| | 100 " |

In forming the plastic mass the pulverized quartz, asbestus, and sand are intimately mixed, after which the hydraulic cement is added, mixed with the other ingredients, and sufficient water used to bring the mass into a plastic state. The massicot is then mixed with linseed or other suitable oil, and thoroughly worked into the plastic mass, when the compound is completed, and may be molded or worked up in any desired way. The blocks or other articles may then be finished by a "slip."

Having thus described my invention, I claim—

A composition or artificial stone composed of hydraulic cement, massicot, asbestus, and pulverized flint, quartz, or sand, substantially as herein described.

In testimony that I claim the foregoing I have hereunto set my hand this 22d day of November, 1872.

MATTHEW T. HAGEN.

Witnesses:
CHAS. J. JAMES,
A. J. CRAWFORD.